Figure 1:
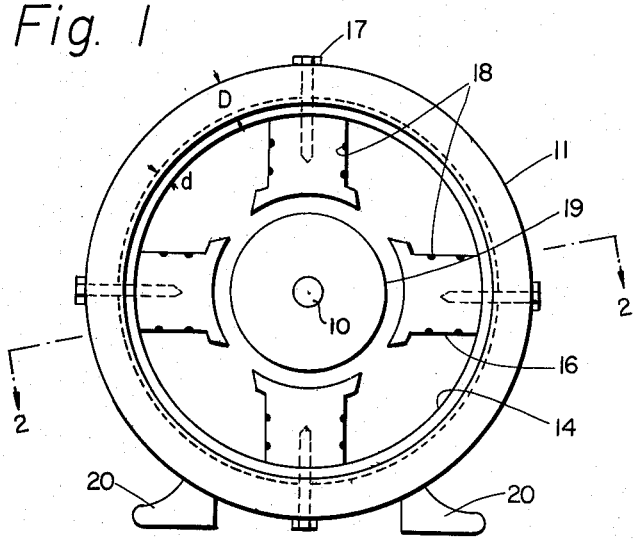

Sept. 1, 1964 RYOICHI IWAI 3,147,393
FAST RESPONSE FIELD MAGNET D.C. DYNAMO-ELECTRIC MACHINE
Filed March 21, 1961 4 Sheets-Sheet 1

INVENTOR.
RYOICHI IWAI
BY Kurt Kelman
AGENT

Sept. 1, 1964 RYOICHI IWAI 3,147,393
FAST RESPONSE FIELD MAGNET D.C. DYNAMO-ELECTRIC MACHINE
Filed March 21, 1961 4 Sheets-Sheet 2

INVENTOR.
BY Ryoichi Iwai
Kurt Kelman
AGENT

INVENTOR.
RYOICHI IWAI

United States Patent Office 3,147,393
Patented Sept. 1, 1964

3,147,393
FAST RESPONSE FIELD MAGNET D.C. DYNAMO-
ELECTRIC MACHINE
Ryoichi Iwai, Toba, Japan, assignor to Shinko Electric
Co., Ltd., Toba, Japan, a corporation of Japan
Filed Mar. 21, 1961, Ser. No. 115,832
9 Claims. (Cl. 310—254)

The present invention is concerned with the construction of the yoke used in D.C. electric machines, such as D.C. motor, D.C. generator, boosters and exciters in general and particularly, with the construction of the yoke used in the D.C. electric machines of quick-response excitation type.

In the sectional-drive system of a paper machine, for example, it is well known that an integral control based on a differential mechanism is utilized in order to reduce the settled error of the velocity of each section to a minimum and to improve the accuracy of the velocity control. However, in order to improve the response to variations in velocity due to sudden changes in load, the responsiveness of the rotating machine to be controlled should be improved as well as the control ability and the responsiveness of the control apparatus. On one hand, rate control is superimposed on integral control for the purpose of suppressing variations in velocity due to sudden changes in load, but on the other hand, it is desirable to improve the responsiveness of the rotating machine to be controlled. In paper manufacturing especially, as the velocity becomes greater, it is necessary that the accuracy of the velocity control at the wet part of the paper materials be quite high, so high responsiveness in the D.C. electric driving machine is absolutely required.

In general, the time constant of the field circuit of the D.C. rotating electric machines should be reduced, and at the same time, the responsiveness of the magnetic circuit should be increased in order to raise the responsiveness of the velocity due to the field control of the D.C. rotating electric machines. It is well known that, in order to improve the responsiveness of a magnetic circuit, the materials of each part constituting the magnetic circuit are to be selected properly, and, in general, yokes made of cast steel or sheet iron are constructed by laminating sheet steel of superior magnetic characteristics, thereby causing a reduction in time lag due to the reduction in eddy current when the magnetic flux in the yoke changes. However, under these circumstances, the cost of a rotating electric machine becomes higher and the size thereof becomes bulky because sheet steel is expensive and a frame is required in order to hold the laminated sheet steel and to secure the end cover and the legs.

On the other hand, the load under ordinary condition of the driving D.C. motor used in sectional-driving is about 70% of the rated output and the variation degree of the load is within 10% of the ordinary load, thus, control of the motor velocity corresponding to the variation in load is effected sufficiently only by changing a small percentage of the field flux. In other words, the velocity control at a sudden change of the load is effected sufficiently by changing the field flux a little when the field control system is employed.

An object of the present invention is to provide a D.C. electric machine which is capable of exhibiting fully the characteristic feature required in a control system in which a high degree responsiveness in control is required, through retention of high responsiveness in the excitation of the D.C. electric machine, in other words, through retention of a high degree of responsiveness to variations of the field flux due to the variation of the field current.

Another object of the present invention is to retain the high degree of responsiveness which is necessary and sufficient to excite the D.C. electric machine at a lower price.

A further object of the present invention is to provide a D.C. electric machine which retains the high degree of responsiveness necessary and sufficient to excite and which is simple in working.

A still further object of the present invention is to provide a D.C. electric machine which is more simple in working by means of punching the elemental plates of the laminated parts of the yoke when the elemental plates of the magnetic pole (the elemental plates for lamination) are punched out as an integral part with one part of the yoke which is laminated at the lamination of the magnetic pole.

Figure 2:
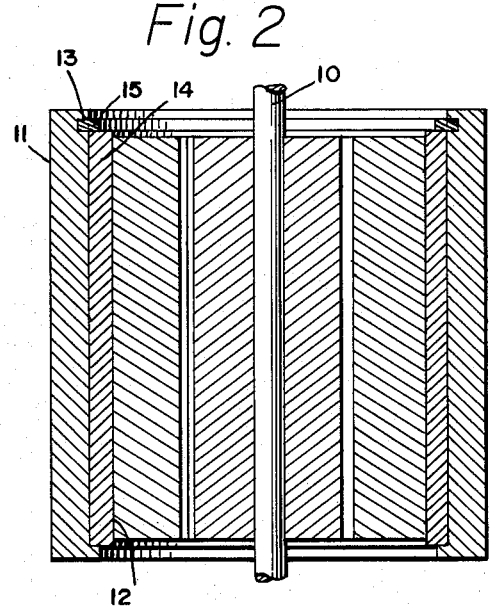

A better understanding of the present invention may be had from the following detailed description when read in connection with the accompanying drawings, wherein FIG. 1 is a front elevation view of the skeleton drawing of the D.C. electric machine showing an embodiment of the present invention, FIG. 2 is a longitudinal sectional view of the upper part of the half of the embodiment shown in FIG. 1, and FIG. 3 to FIG. 7 are front elevation views of the skeleton drawings of the D.C. electric machine showing the other embodiments of the present invention respectively.

Referring to FIG. 1 and FIG. 2 in more detail, there is shown outer cylindrical body 11 made of solid or magnetically continuous magnetic materials such as cast steel or sheet iron having stair 12 on the lower end thereof, as viewed in FIG. 2, and key way 13 on the upper end. There is also shown inner cylindrical body 14 made from laminations of punched sheet steel such as silicon steel annularly. Inner cylindrical body 14 is secured so that the lower end of inner cylindrical body 14, in FIG. 2, contacts stair 12 and under this condition key 15 is driven into key way 13. Laminated magnetic poles 16 are partly constituted by the inner cylindrical body 14 and a part of outer cylindrical body 11 contacting inner cylindrical body 14, and the rest part of outer cylindrical body 11 acts as the yoke which magnetically and mechanically connects the poles 16. All the laminated steel sheets are welded together at spots 18 and magnetic poles 16 are secured to the inner face of the outer cylindrical body 11 by means of bolts 17. The armature 19 is mounted for rotation on the shaft 10. Legs 20 are attached directly onto the periphery of outer cylindrical body 11. The ratio between the thickness D of outer cylindrical body 11 and the thickness $d$ of a circumferentially corresponding portion of inner cylindrical body 14 is determined according to the quantity of the abrupt variation of the load under the normal operation of the D.C. electric machine having the yoke mentioned above. For example, if the D.C. electric machine referred to above operates as a D.C. motor and the variation in load which may occur under normal operations, in other words, under the 70% load, is about 10% of the load then operating, it may be assumed that the velocity variation corresponding to the sudden variation of said load of the D.C. motor is about 10% even when the Ward-Leonard system is employed as the control system of the D.C. motor. Accordingly, the regulation of the field flux of said motor to be varied in order to control the velocity variation stated above is sufficient at about 10% and the sectional area of inner cylindrical body 14 in other words, the thickness of inner cylindrical body 14 may be determined so that the flux density in inner cylindrical body 14 is not saturated when 10% of the field flux of the D.C. motor is added to the field flux of inner cylindrical body 14 at 70% load of the D.C. motor. Generally, the value of $d$ is sufficient if set at about one-fifth of D.

Under the construction stated above, as the total field flux is distributed nearly in proportion to the sectional areas of inner and outer cylindrical bodies under normal operation, if the field flux is changed in order to control the velocity variation due to sudden variations in load, the change in the field flux of inner cylindrical body 14 is suppressed by the generation of eddy current and thereby the change in the field flux is delayed. However, as inner cylindrical body 14 is constituted from laminated steel sheet, scarcely any eddy current is generated due to the change in the field flux, accordingly the variation in the magnetic flux in inner cylindrical cylinder is effected instantaneously. As magnetic poles 16 are also laminated the variation in the magnetic flux in these parts are also effected instantaneously, and it follows that the variation in the magnetic path comprised of inner cylindrical body 14 and magnetic poles 16 is also effected instantaneously.

Figure 3:
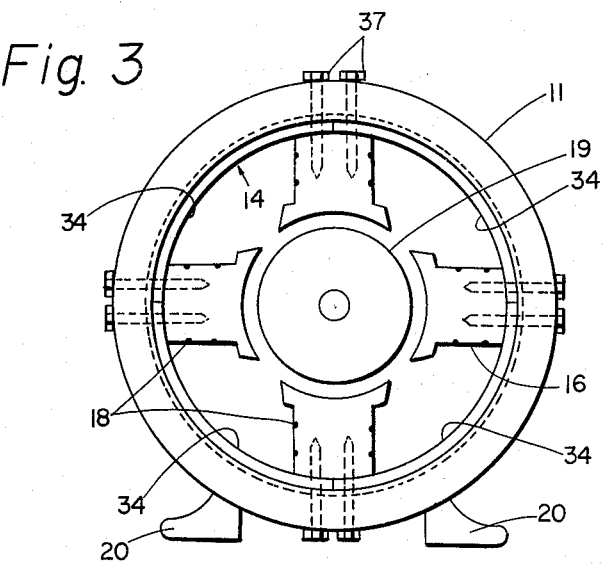

Referring to FIG. 3 in more detail, there is shown the construction of the yoke and the magnetic pole of large size D.C. electric machine. In this figure corresponding parts are identified by the same reference numerals as in FIG. 1. The complete inner cylindrical body designated by reference numeral 14 is the integration of a plurality of sectional inner cylindrical bodies 34 which are punched out of a sheet steel in arcuate form and butt joint welded with each other at both ends of the arch. It is desirable that the welded parts of each of the sectional inner cylindrical bodies 34 be on the centre line of each of magnetic poles 16. In this arrangement, the magnetic flux passing through magnetic poles 16 is divided into two directions, left ward and right ward of each of the centre lines and enters the yoke, therefore, the reluctance at the welded part has no effect on the passing through of the magnetic flux. Magnetic poles 16 are fixed onto the yoke by means of a plurality of bolts 37.

Figure 4:
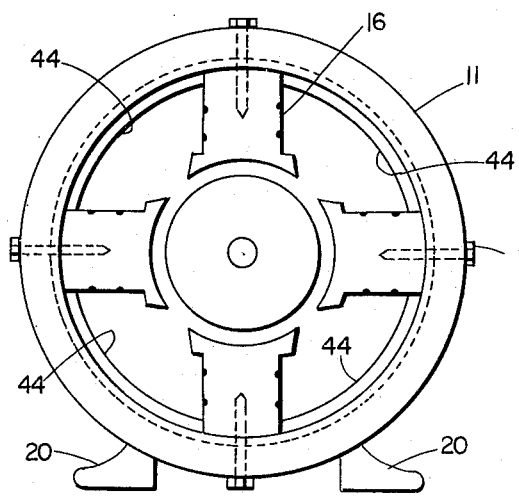

Referring to FIG. 4, there is shown another embodiment of the present invention. In these figures shown hereinafter corresponding parts are identified by the same reference numerals as in FIG. 1. Magnetic poles 16 are secured directly on outer cylindrical body 11 by means of bolts 17. Arcuate body 44 of laminated steel sheets punched in an arcuate form is attached at the inner circumferential side of outer cylindrical body 11, the arcuate length of each element of arcuate body 44 is determined so that the end surface in the arcuate direction of each of arcuate body 44 is butted against each of the side surfaces of magnetic poles 16 which is adjacent to said arcuate body 44, when arcuate body 44 is assembled within the inner circumferential side of outer cylindrical body 11. The yoke is constructed by combining outer cylindrical body 11 and arcuate body 44.

Figure 5:
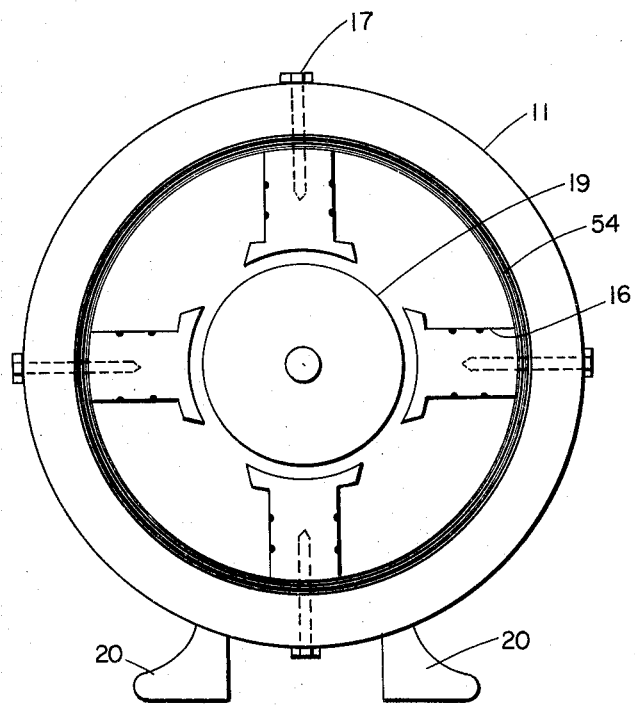

Referring to FIG. 5, there is shown another embodiment of the present invention. Inner cylindrical body 54 is formed by rolling up sheet steel such as silicon steel into a multi-layered coil and inserting the coil in the space inside of outer cylindrical body made of solid magnetic material such as cast steel or sheet iron. The yoke is constituted by combining outer cylindrical body 11 and inner cylindrical body 54. Magnetic poles 16 are secured onto the yoke by means of bolts 17. In this case the ratio of the thickness between outer cylindrical body 11 and inner cylindrical body 54 is about five to one. Outer cylindrical body 11 provides no stair 12, key way 13 and key 15 as shown in FIG. 2.

Figure 6:
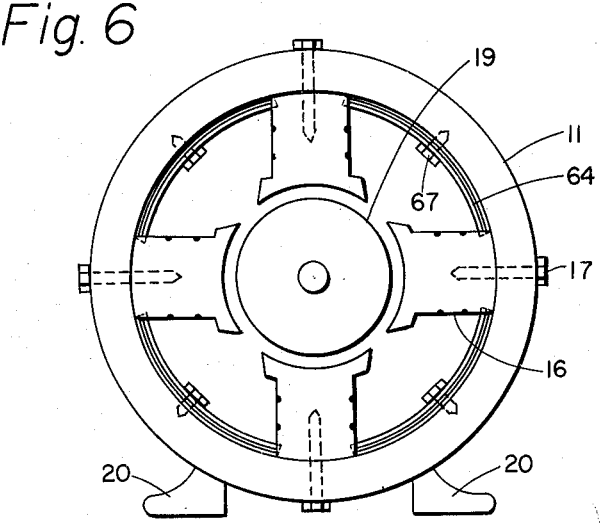

Referring to FIG. 6, there is shown a further embodiment of the present invention. Laminated magnetic poles 16 are secured to outer cylindrical body 11 made of solid magnetic material such as cast steel or sheet iron by means of bolts 17. Arcuate bodies 64 are secured onto the inner circumferential surface of outer cylindrical body 11 by means of bolts 67. Each sheet element comprising arcuate bodies 64 is punched out in rectangular form and they are stacked or superimposed in a radial direction. The stacked sheet elements which are laminated are secured by means of bolts 67 as stated above and thereafter the both ends of the stacked element sheets are finished by scraping so that the scraped ends can be butted against the side surfaces of both magnetic poles 16. The broken lines at the end of the ends of the stacked sheet elements indicate the scraped parts. In this embodiment, as all sheet elements of arcuate bodies 64 are rectangular, the amount at waste is quite low compared with the punching procedure in which circular or arcuate sheet elements are produced, and therefore it can be recognized that the procedure shown in FIG. 6 is economical.

Figure 7:
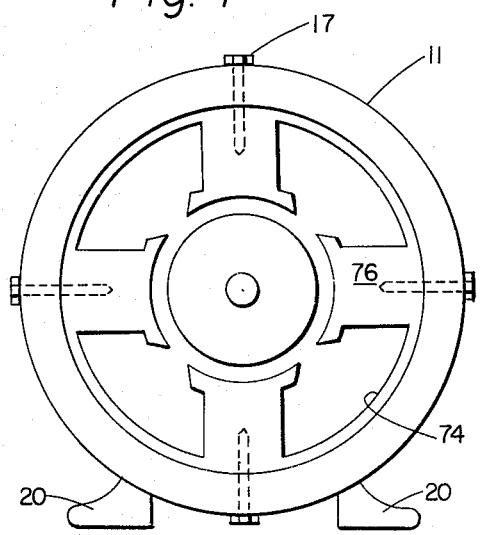

Referring to FIG. 7, there is shown an embodiment in which the present invention is advantageously carried out in D.C. electric machines of small size. The outer cylindrical body of this embodiment is equivalent to outer cylindrical body 11 shown in FIG. 1 and FIG. 2, while magnetic poles 76 integrated with inner cylindrical body 74 are punched out of the original sheets and secured onto the outer cylindrical body by means of bolts 17.

Thus, it may be seen that there has been provided, in accordance with the present invention, as the yoke provides the laminated part a D.C. electric machine in which a high degree of responsiveness to variations of the field flux due to variation of the field current is attained, and the outer cylindrical body of the present invention is sturdy enough to serve as an installing base, in consequence the outer frame which does not form the magnetic path can be reduced or omitted, therefore, the D.C. electric machine can become smaller and lighter. Especially, in the construction shown in FIG. 4 and FIG. 6, only by attaching arcuate laminated body 44 or 64 onto outer cylindrical body 11, the D.C. electric machine can obtain highly responsive velocity regulation, at the same time, provides a characteristic feature in that the end cover etc. of the electric machine of the present invention can be made common to that of the ordinary electric machine in which the yoke thereof is made of cast steel etc.

While there has been described above the principles of this invention in connection with specific apparatus, it is to be clearly understood that this description is made only by way of example and not as limitation to the scope of the invention as set forth in the objects thereof and in the accompanying claims.

What is claimed is

1. In a direct current machine, in combination:
    (a) armature means having an axis;
    (b) a plurality of pole means spaced about said axis in a circumferential direction, said pole means and said armature means being mounted for relative rotation about said axis; and
    (c) yoke means fixedly fastened to said plurality of pole means and extending therebetween in said circumferential direction for magnetically and mechanically connecting said pole means, said yoke means including
        (1) an outer yoke body of magnetically continuous material, said body mechanically and magnetically connecting said pole means and having a face opposite said armature means;
        (2) an inner yoke body mounted on said face of said outer yoke body and including a plurality of laminations,
        (3) each lamination of said inner yoke body extending in said circumferential direction between said pole means for magnetically connecting the same,
        (4) said laminations being superposed in a direction transverse of said circumferential direction,
        (5) the thickness of said outer body in a radial direction relative to said axis being greater than the thickness of said inner body in said radial direction.

2. In a machine as set forth in claim 1, said yoke bodies being annular about said axis.

3. In a machine as set forth in claim 1, said yoke bodies being substantially cylindrical about said axis.

4. In a machine as set forth in claim 1, the laminations of said inner yoke body jointly constituting a cylinder about said axis, each of said laminations extending in said cylinder about a portion of the circumference thereof, and fastening means interposed between two circumferentially successive laminations.

5. In a machine as set forth in claim 4, said fastening means being a butt weld.

6. In a machine as set forth in claim 1, said inner body including a coiled sheet member, respective layers of said coiled member constituting said laminations.

7. In a machine as set forth in claim 1, said plurality of pole means including a plurality of laminations, the laminations of said pole means being integral with respective laminations of said inner yoke body.

8. In a machine as set forth in claim 7, each integral lamination of said pole means and of said inner yoke body constituting a unitary annular body about said axis.

9. In a direct current machine, in combination:
 (a) armature means having an axis;
 (b) substantially cylindrical yoke means coaxial with said armature means, said armature means and yoke means being mounted for relative rotation about said axis, said yoke means including
  (1) an outer substantially cylindrical yoke body of magnetically continuous material having an annular face opposite said armature means, and
  (2) a plurality of inner yoke bodies mounted on said face; and
 (c) a plurality of pole means mounted on said face and spaced from each other in a circumferential direction,
  (1) said inner yoke bodies respectively extending between two circumferentially consecutive said pole means, said inner yoke bodies each including a plurality of laminations, each lamination abuttingly engaging said two consecutive pole means,
  (2) the thickness of each inner yoke body in a direction radial with respect to said axis being substantially smaller than the radial thickness of the circumferentially corresponding portion of said outer yoke body.

References Cited in the file of this patent

UNITED STATES PATENTS

| | | |
|---|---|---|
| 2,247,890 | Reardon | July 1, 1941 |
| 2,470,767 | Ellis | May 24, 1949 |
| 2,492,678 | Amtsberg | Dec. 27, 1949 |
| 2,501,814 | Gillen | Mar. 28, 1950 |

FOREIGN PATENTS

| | | |
|---|---|---|
| 1,188,515 | France | Mar. 16, 1959 |